Dec. 9, 1924.
W. H. KEATES
HIGH SPEED BOAT
Filed Nov. 23, 1923
1,518,263
2 Sheets-Sheet 2
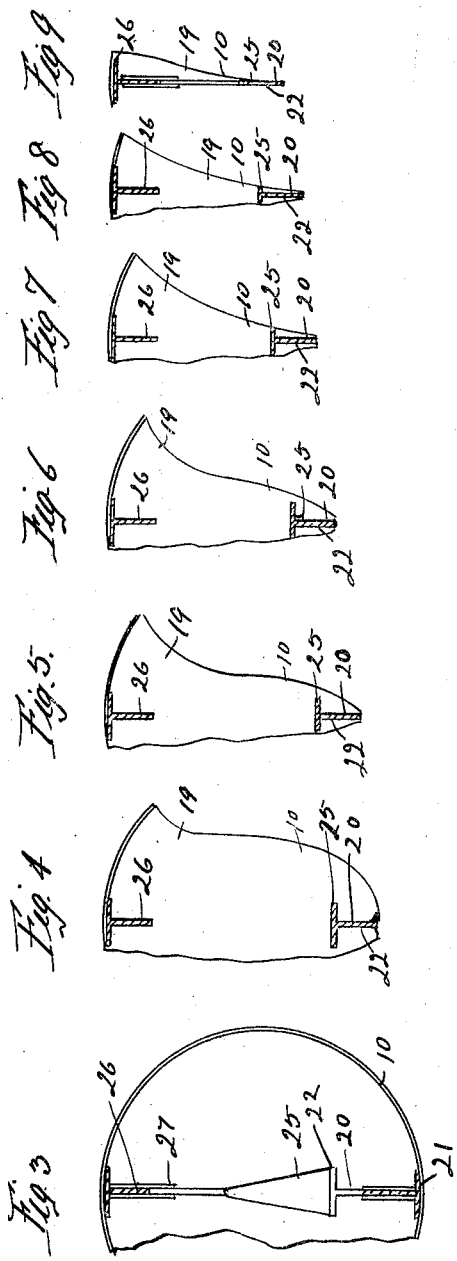
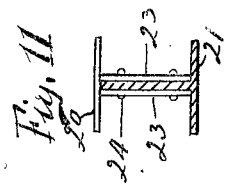
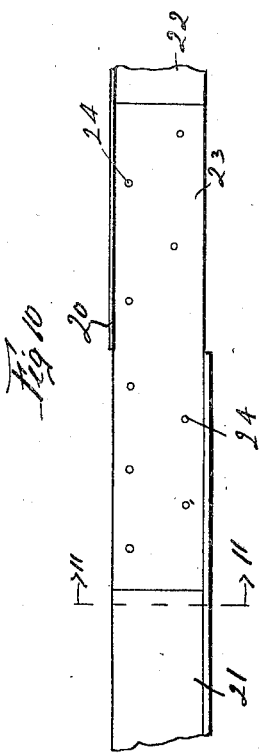
INVENTOR
William H. Keates
By W.W.Williamson
Atty.

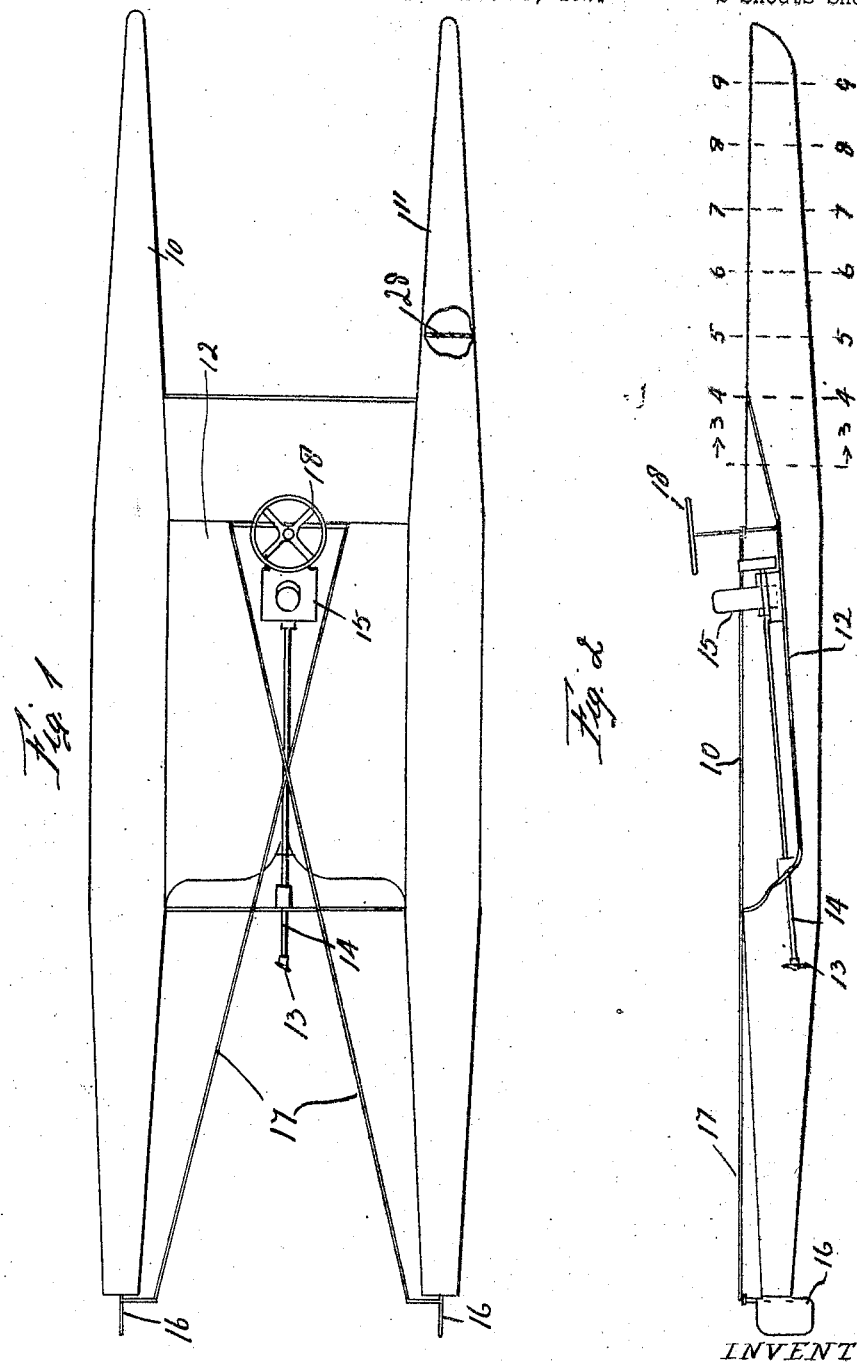

Patented Dec. 9, 1924.

1,518,263

UNITED STATES PATENT OFFICE.

WILLIAM H. KEATES, OF PHILADELPHIA, PENNSYLVANIA.

HIGH-SPEED BOAT.

Application filed November 23, 1923. Serial No. 676,480.

*To all whom it may concern:*

Be it known that I, WILLIAM H. KEATES, a citizen of the United States, residing at Philadelphia, in the county of Philadelphia and State of Pennsylvania, have invented new and useful Improvements in a High-Speed Boat, of which the following is a specification.

My invention relates to new and useful improvements in a high speed boat, and has for its primary object to so construct a device of this character that the draught of the pontoon hulls will be very slight thus eliminating any undue friction of the water on the surfaces thereof.

Another object of the invention is to so construct the forward end of the pontoons as to assist in lifting the boat whereby it will have a tendency to skim over the water.

Another object of the invention is to divide the interior of the pontoons into a plurality of air and water tight chambers by suitable transverse partitions in order to prevent sinking even should the pontoon shells be punctured in the region of a number of the compartments.

A further object of this invention is to so construct the forward end of the deck, which is situated between two pontoons, as to have a tendency to ride on the surface of the water.

A still further object of this invention is to so construct the counter as to prevent or reduce the possibility of eddies so that the propeller will always have a solid body of water to operate in.

With these ends in view, this invention consists in the details of construction and combination of elements hereinafter set forth and then specifically designated by the claims.

In order that those skilled in the art to which this invention appertains, may understand how to make and use the same, I will describe its construction in detail, referring by numerals to the accompanying drawings forming a part of this application, in which:—

Fig. 1, is a plan view of a simple form of the embodiment of my invention.

Fig. 2, is a side elevation thereof with the near side pontoon hull removed.

Fig. 3, is an enlarged fragmentary section at the line 3—3 of Fig. 2, with the partitions forward thereof removed.

Fig. 4, is a fragmentary section at the line 4—4 of Fig. 2.

Fig. 5, is a fragmentary section at the line 5—5 of Fig. 2.

Fig. 6, is a fragmentary section at the line 6—6 of Fig. 2.

Fig. 7, is a fragmentary section at the line 7—7 of Fig. 2.

Fig. 8, is a fragmentary section at the line 8—8 of Fig. 2.

Fig. 9, is a fragmentary section at the line 9—9 of Fig. 2.

Fig. 10, is an enlarged fragmentary side elevation of the keel.

Fig. 11, is a section at the line 11—11 of Fig. 10.

In carrying out my invention as here embodied, 10 and 11 represent two hull pontoons arranged in parallelism and having connected therewith and located therebetween a deck 12 which is inclined from its after end forwardly, the major portion being preferably inclined at one angle and the minor forward portion being inclined at a less acute angle so that as the boat is driven forward there will be a tendency to lift the forward end and skim upon the water. The counter at the after end of the deck is formed of a double curve thereby producing a recess so that the eddies incident to the travel of the boat through the water will be broken up and give a solid body of water in which the propeller 13 may operate, said propeller being mounted on the propeller shaft 14 driven by any desirable motor 15 here shown as an internal combustion engine.

The boat is steered by means of rudders 16 one of which is mounted at the stem of each pontoon and these are connected by rods 17 which cross each other with the steering gear 18.

The main or load holding portion of the deck is aft of the midship thus adding to the tendency of the bow to be lifted from the water so that it will be caused to glide thereon.

The waist of each pontoon is circular in cross section as plainly shown in Fig. 3, while the shell on each side of the bow is cyma recta throughout a portion of its length to form an overhang 19, as shown in Figs. 4 to 6 inclusive and from the location of the section shown in Fig. 6 both sides of the shell gradually change to a concave as illustrated in Figs. 7 and 8 and then again gradually change to a slight cyma reversa as shown in Fig. 9. The upper portion of the shell of the bow of each pontoon maintains its arcuate or convex shape as shown in Figs. 3 to 9 inclusive while the sides of the shell gradually converge to the cutwater.

Within each pontoon is a keel 20 preferably formed of two T-irons 21 and 22, the after T-iron being inverted so that the shell coacts directly with the flange or head of the T-iron while the one numbered 22 is upright so that the shell coacts directly with the edge of the web. These two T-irons, or sections of the keel, are joined together in the region of the meeting point of the waist and bow by means of plates 23 which are fixed to both sides of the T-iron webs by suitable fastening devices 24 such as rivets. The forward end of the keel, and more particularly the T-iron section 22, is bent upward to correspond to the inclination of the lower part of the pontoon and both edges of the flanges or head are cut away as indicated at 25 so that said edges converge toward the bow until the head or flange is entirely eliminated, as plainly shown in Fig. 3. The remaining end web is then attached to the top brace 26 by means of plates 27 riveted to the sides the same as the two sections of the keel are fastened together and this top brace is preferably also a T-iron with the head or flange in engagement with the top portion of the pontoon shell.

The interior of the pontoon is divided into a number of compartments by means of transverse partitions 28, Fig. 1, which compartments are water and air tight so as to add to the bouyancy of the pontoons and prevent sinking of the boat even though the pontoons should be damaged in the region of a number of the compartments.

A boat constructed in this manner will draw but little water so that the water friction will be greatly reduced thereby permitting the boat to be driven at high speed with a relatively small amount of power and because of the spread of the pontoons there is but small possibility that the boat could be capsized. Further the inclination of the deck 12 and the overhang formation of the bows of the pontoons tend to lift the boat out of the water after the manner of a plane thereby causing the boat to skim or glide over the water.

Of course I do not wish to be limited to the exact details of construction as here shown as these may be varied within the limits of the appended claims without departing from the spirit of my invention.

Having thus fully described my invention, what I claim as new and useful is:—

1. A boat comprising two pontoons arranged in parallelism, each of said pontoons having a portion of circular formation in cross section and having a bow provided with an overhang on each side and a deck inclined forwardly arranged between the pontoons.

2. A boat comprising, in combination, a pair of pontoons in parallelism, the interiors of said pontoons being divided into air tight and water tight compartments, each of said pontoons having a circular waist, a bow projecting from the waist having its sides converging toward the cutwater, said sides adjacent the waist being cyma recta, the intermediate portion being concaved and the forward end being cyma reversa to form overhangs, a deck fixed to and located between the pontoons in the region of the waist, the major portion of said deck being inclined at one angle and the forward end inclined at a more acute angle with the counter constructed on a double curve and propeller shafts passing through the counter and having a propeller thereon, means for driving the propeller shaft and means for steering the boat.

3. A boat comprising, in combination, a pair of pontoons in parallelism, the interiors of said pontoons being divided into air tight and water tight compartments, each of said pontoons having a circular waist, a bow projecting from the waist having its sides converging toward the cutwater, said sides adjacent the waist being cyma recta, the intermediate portion being concaved and the forward end being cyma reversa to form overhangs, a sectional keel within each pontoon and comprising two T-irons in reverse positions, the forward T-iron being upright and bent to conform to the inclination of the bottom of the pontoon shell and having the flange or head cut away on each side near the extreme forward end so as to fit within the diminishing space between the side walls of the pontoon bow, means for joining the forward end of the keel to the forward end of the top brace, a deck fixed to and located between the pontoons in the region of the waist, the major portion of said deck being inclined at an angle and the forward end inclined at a more acute angle with the counter constructed on a double curve and propeller shafts passing through the counter and having a propeller thereon, means for driving the propeller shaft and means for steering the boat.

In testimony whereof, I have hereunto affixed my signature.

WILLIAM H. KEATES.